US010274320B2

(12) United States Patent
Chin et al.

(10) Patent No.: US 10,274,320 B2
(45) Date of Patent: Apr. 30, 2019

(54) METHOD AND DEVICE FOR PROVIDING SAFE ZONE INFORMATION FOR INCIDENT AREA (71) Applicant: MOTOROLA SOLUTIONS, INC., Chicago, IL (US)

(72) Inventors: Eugene Chin, Penang (MY); Tih Huang Yeoh, Perlis (MY); Alfy Merican Ahmad Hambaly, Penang (MY); Prebesh Pavithran, Penang (MY); Kuan Heng Lee, Penang (MY); Mern Keat Lee, Penang (MY); Ming Yeh Koh, Penang (MY); Guo Dong Gan, Kuala Lumpur (MY); Bing Qin Lim, Penang (MY)

(73) Assignee: MOTOROLA SOLUTIONS, INC., Chicago, IL (US)

(*) Notice: Subject to any disclaimer, the term of this patent is extended or adjusted under 35 U.S.C. 154(b) by 76 days.

(21) Appl. No.: 15/669,750

(22) Filed: Aug. 4, 2017

(65) Prior Publication Data
US 2019/0041216 A1  Feb. 7, 2019

(51) Int. Cl.
| *G06T 1/00* | (2006.01) |
| *G01C 21/00* | (2006.01) |
| *G02B 27/01* | (2006.01) |
| *G06F 3/0481* | (2013.01) |
| *G06T 15/50* | (2011.01) |
| *G08G 1/16* | (2006.01) |
| *G08G 1/0968* | (2006.01) |

(52) U.S. Cl.
CPC ......... *G01C 21/005* (2013.01); *G02B 27/017* (2013.01); *G06F 3/04815* (2013.01); *G06T 15/506* (2013.01); *G02B 2027/0138* (2013.01); *G08G 1/096811* (2013.01); *G08G 1/166* (2013.01)

(58) Field of Classification Search
CPC ..... H04L 47/10; H04L 43/50; H04L 12/2697; H04L 43/0852; H04L 43/00
USPC ....................................................... 370/252
See application file for complete search history.

(56) References Cited

U.S. PATENT DOCUMENTS

| 7,349,768 B2 | 3/2008 | Bruce et al. | |
| 8,965,044 B1 * | 2/2015 | Owechko ........... | G06K 9/00369 382/103 |
| 9,047,781 B2 * | 6/2015 | Geter ..................... | G08G 1/166 |

(Continued)

Primary Examiner — Gordon G Liu
(74) Attorney, Agent, or Firm — Michael Best & Friedrich LLP (57) ABSTRACT Method and device for providing safe zone information. The method includes receiving a map of an incident area sensor information from at least one sensor at the incident area. The method also includes determining a multi-dimensional model of the incident area based on the map of the incident area and the sensor information and determining a first threat location based on the sensor information, the map of the incident area, and the multi-dimensional model of the incident area. The method further includes determining a plurality of safe zone shadow areas based on the first threat location. The method also includes updating the multi-dimensional model of the incident area to include the plurality of safe zone shadow areas and to generate a safe zone shadow representation of the incident area and transmitting the safe zone shadow representation to at least one user device in the incident area.

16 Claims, 10 Drawing Sheets (56) References Cited

U.S. PATENT DOCUMENTS

| | | |
|---|---|---|
| 2012/0068913 A1 | 3/2012 | Bar-Zeev et al. |
| 2015/0116354 A1 | 4/2015 | Tomlin et al. |
| 2015/0310729 A1* | 10/2015 | Lampert .............. G08B 27/001 340/539.11 |
| 2016/0012642 A1 | 1/2016 | Lee et al. |
| 2016/0232774 A1* | 8/2016 | Noland .............. G08B 13/1672 |
| 2018/0114421 A1* | 4/2018 | Siminoff .......... G08B 13/19606 |

* cited by examiner

METHOD AND DEVICE FOR PROVIDING SAFE ZONE INFORMATION FOR INCIDENT AREA

BACKGROUND OF THE INVENTION

Public safety personnel often enter dangerous situations. For example, police officers may encounter an armed suspect, an active shooter, or other threats (for example, explosive materials). In these situations, public safety personnel may not have any or sufficient information regarding the location of the threat and the surrounding area (sometimes referred to as the incident area).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

The incident area where the public safety personnel are deployed may include many sensors (for example, audio sensors, video cameras, and the like). Public safety personnel may have access to these sensors (some may even be body-worn sensors) and may receive information regarding the incident area in real time. Even though public safety personnel may receive information regarding the incident area, public safety personnel may not know where to take cover from an active shooter or other threat.

One embodiment provides a method of providing safe zone information including receiving, at an electronic processor, a map of an incident area and receiving, at the electronic processor, sensor information from at least one sensor located at the incident area. The method also includes determining, using the electronic processor, a multi-dimensional model of the incident area based on the map of the incident area and the sensor information and determining, using the electronic processor, a first threat location based on the sensor information, the map of the incident area, and the multi-dimensional model of the incident area. The method further includes determining, using the electronic processor, a plurality of safe zone shadow areas based on the first threat location. The first threat location is represented as a virtual source of light and the plurality of safe zone shadow areas are determined based on the virtual source of light acting on one or more objects in the multi-dimensional model of the incident area. The method also includes updating, using the electronic processor, the multi-dimensional model of the incident area to include the plurality of safe zone shadow areas and to generate a safe zone shadow representation of the incident area and transmitting, using a transmitter coupled to the electronic processor, the safe zone shadow representation to at least one user device in the incident area.

Another embodiment provides a device for providing safe zone information including a transmitter and an electronic processor coupled to the transmitter. The electronic processor is configured to receive a map of an incident area and receive sensor information from a sensor located at the incident area. The electronic processor is also configured to determine a multi-dimensional model of the incident area based on the map of the incident area and the sensor information and determine a threat location based on the sensor information, the map of the incident area and the multi-dimensional model of the incident area. The electronic processor is further configured to determine a plurality of safe zone shadow areas based on the threat location. The threat location is represented as a virtual source of light and the plurality of safe zone shadow areas are determined based on the virtual source of light acting on one or more objects in the multi-dimensional model of the incident area. The electronic processor is configured to update the multi-dimensional model of the incident area to include the plurality of safe zone shadow areas and to generate a safe zone shadow representation of the incident area and transmit, using the transmitter, the safe zone shadow representation to at least one user device in the incident area.

Figure 1:
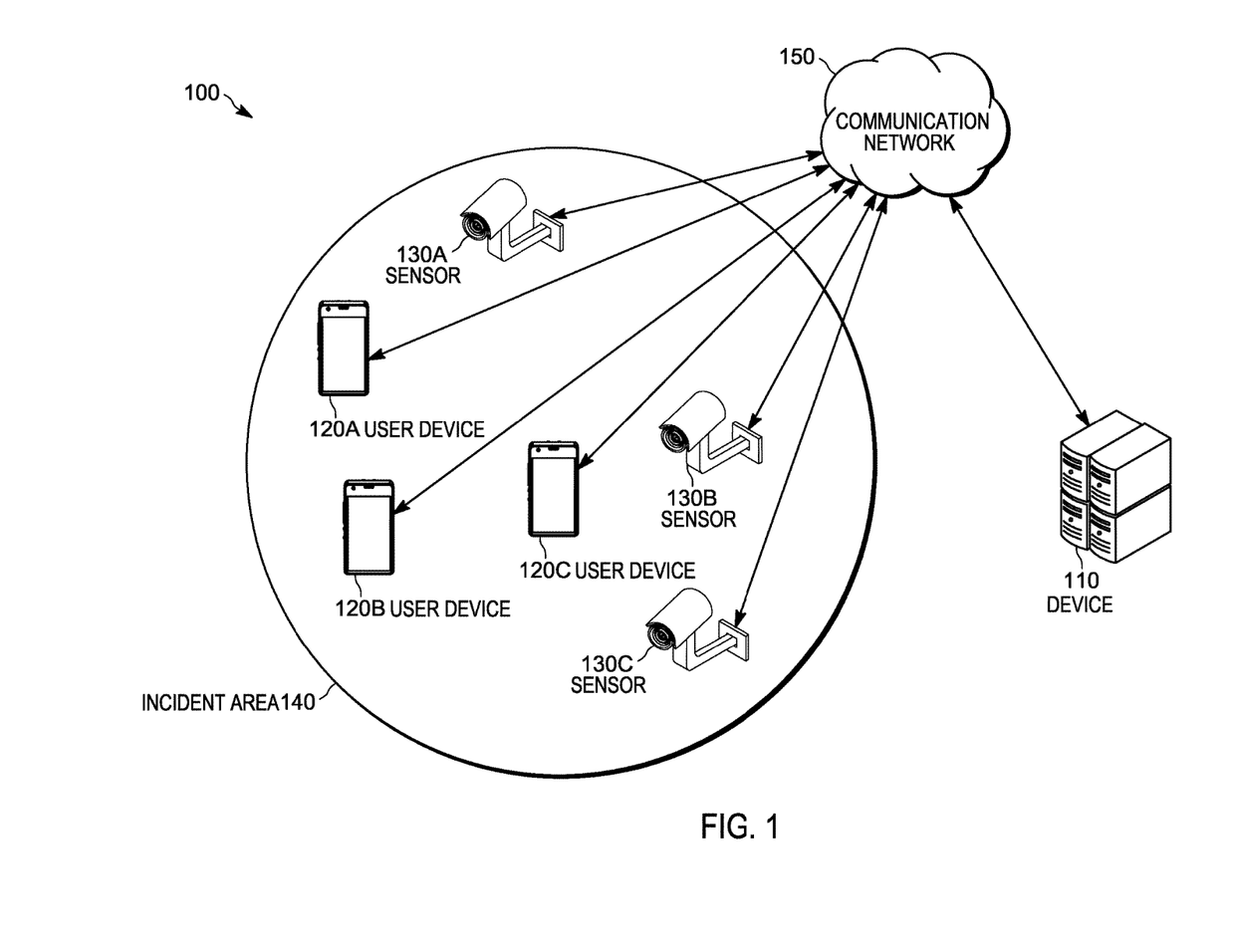
FIG. 1 is a diagram of safe zone shadowing system for an incident area in accordance with some embodiments.

FIG. 1 is a diagram of one embodiment of a safe zone shadowing system 100. The safe zone shadowing system 100 includes a device 110 communicating with user devices 120A through 120C and sensors 130A through 130C located in an incident area 140 over a communication network 150.

The device 110 may be, for example, a call dispatcher at a public safety office location or command center. In some embodiments, the device 110 may be a computing server or base station deployed at the incident area 140, for example, in a surveillance van. The user devices 120A through 120C may be, for example, vehicle two-way radios, personal two-way radios, head-mounted displays (HMDs), smart telephones, tablet computers, laptop computers, smart watches, augmented reality display devices or the like issued to public safety personnel. The user devices 120A through 120C are singularly referred to as user device 120. The sensors 130A through 130C may be, for example, video cameras (including CCTV cameras, drone cameras, smartphone cameras, and the like), acoustic sensors, ultrasonic sensors, and the like. The sensors 130A through 130B are singularly referred to as sensor 130. FIG. 1 illustrates only one example embodiment of the safe zone shadowing system 100, and the safe zone shadowing system 100 may include additional or fewer components in configurations different from the safe zone shadowing system 100 illustrated in FIG. 1. For example, the incident area 140 may include additional or fewer user devices 120 and may include additional or fewer sensors 130.

The communication network 150 may be a wired or wireless communication network, such as a cellular network, a land mobile radio (LMR) network, or the like. Portions of the communication network 150 may be implemented using a wide area network, such as the Internet, a local area network, such as a Bluetooth™ network or Wi-Fi, and combinations or derivatives thereof. The communication network 150 may be used by organizations, such as public safety organizations, to provide services to users associated with an incident, such as a public safety incident.

Figure 2:
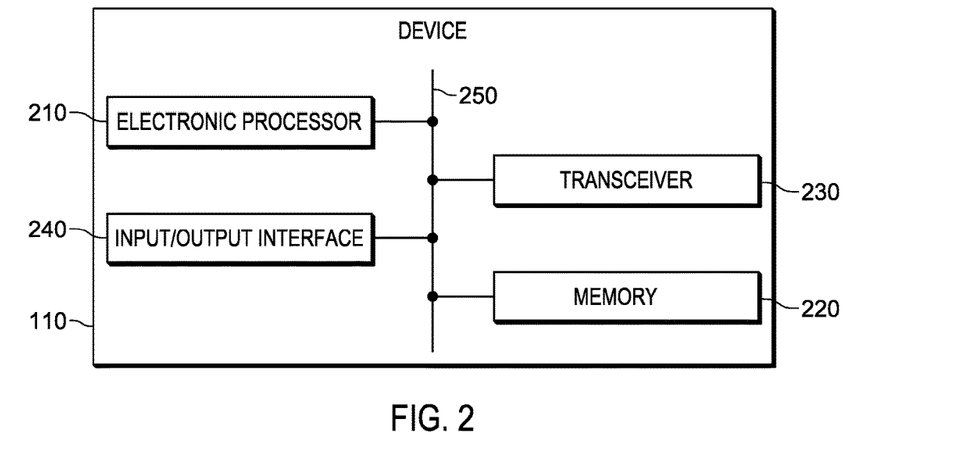
FIG. 2 is a diagram of a device of the safe zone shadowing system of FIG. 1 in accordance with some embodiments.

FIG. 2 is a diagram of one embodiment of the device 110. In the example illustrated, the device 110 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example embodiment of a device 110. The device 110 may include more or fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), an applications specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the device 110 described herein. The memory 220 may include, for example, a program storage area and a data storage area. The program storage area and the data storage area may include combinations of different types of memory, such as read-only memory and random-access memory.

The transceiver 230 enables wired or wireless communication between the device 110 and the communication network 150. In some embodiments, rather than a transceiver 230 the device 110 may include separate transmitting and receiving components, for example, a transmitter and a receiver.

The input/output interface 240 may include one or more input mechanisms (for example, a touch pad, a keypad, a button, a knob, and the like), one or more output mechanisms (for example, a display, a speaker, and the like), or a combination thereof, or a combined input and output mechanism such as a touch screen.

Figure 3:
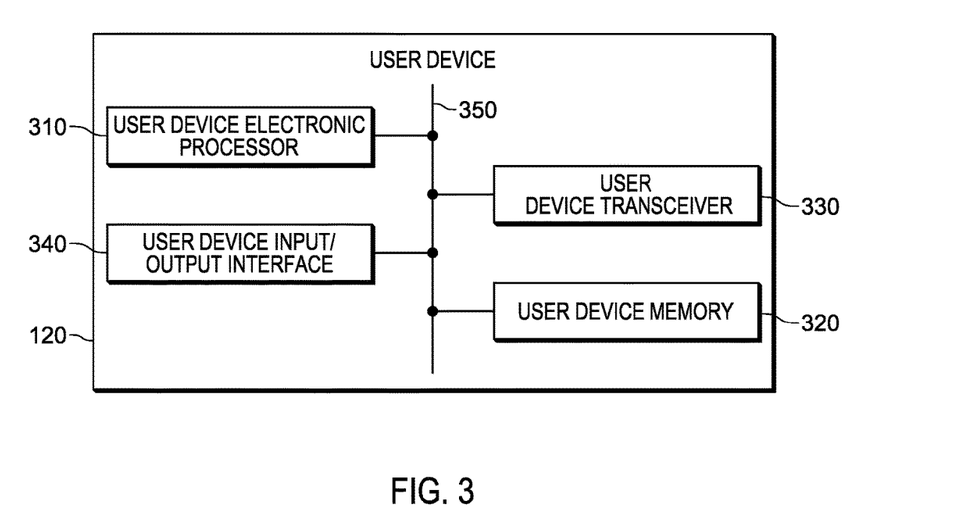
FIG. 3 is a diagram of a user device of the safe zone shadowing system of FIG. 1 in accordance with some embodiments.

FIG. 3 is a diagram of one embodiment of the user device 120. In the example illustrated, the user device 120 includes a user device electronic processor 310, a user device memory 320, a user device transceiver 330, and a user device input/output interface 340. The user device electronic processor 310, the user device memory 320, the user device transceiver 330, and the user device input/output interface 340 communicate over one or more control and/or data buses (for example, a user device communication bus 350). FIG. 3 illustrates only one example embodiment of a user device 120. The user device 120 may include more or fewer components and may perform functions other than those explicitly described herein.

The user device electronic processor 310 may be implemented in various ways including ways that are similar to those described above with respect to the electronic processor 210. Likewise, the user device memory 320 may be implemented in various ways including ways that are similar to those described with respect to the memory 220. The user device memory 320 may store instructions that are received and executed by the user device electronic processor 310 to carry out functionality described herein.

The user device transceiver 330 enables wireless communication between the user device 120 and the communication network 150. In some embodiments, rather than a user device transceiver 330 the user device 120 may include separate transmitting and receiving components, for example, a transmitter and a receiver.

The user device input/output interface 340 may include components similar to those described with respect to the input/output interface 240.

Figure 4:
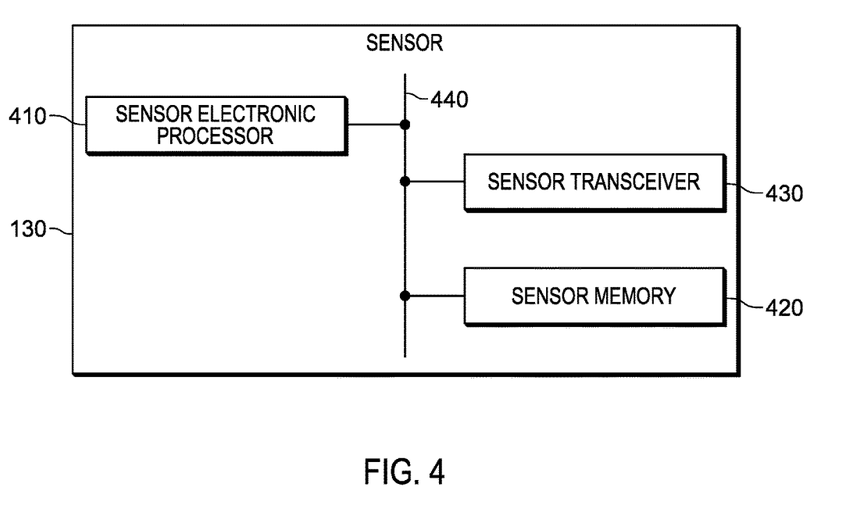
FIG. 4 is a diagram of a sensor of the safe zone shadowing system of FIG. 1 in accordance with some embodiments.

FIG. 4 is a diagram of one embodiment of the sensor 130. In the example illustrated, the sensor 130 includes a sensor electronic processor 410, a sensor memory 420, and a sensor transceiver 430. The sensor electronic processor 410, the sensor memory 420, and the sensor transceiver 430 communicate over one or more control and/or data buses (for example, a sensor communication bus 440). FIG. 4 illustrates only one example embodiment of a sensor 130. The sensor 130 may include more or fewer components and may perform functions other than those explicitly described herein.

The sensor electronic processor 410 and the sensor memory 420 may be implemented in various ways including ways that are similar to those described above with respect to other processors and memory. Likewise, the sensor memory 420 may store instructions that are received and executed by the sensor electronic processor 410 to carry out functionality described herein.

The sensor transceiver 430 enables wireless communication between the sensor 130 and the communication network 150. In other embodiments, rather than a sensor transceiver 430, the sensor 130 may include separate transmitting and receiving components, for example, a transmitter, and a receiver.

Figure 5:
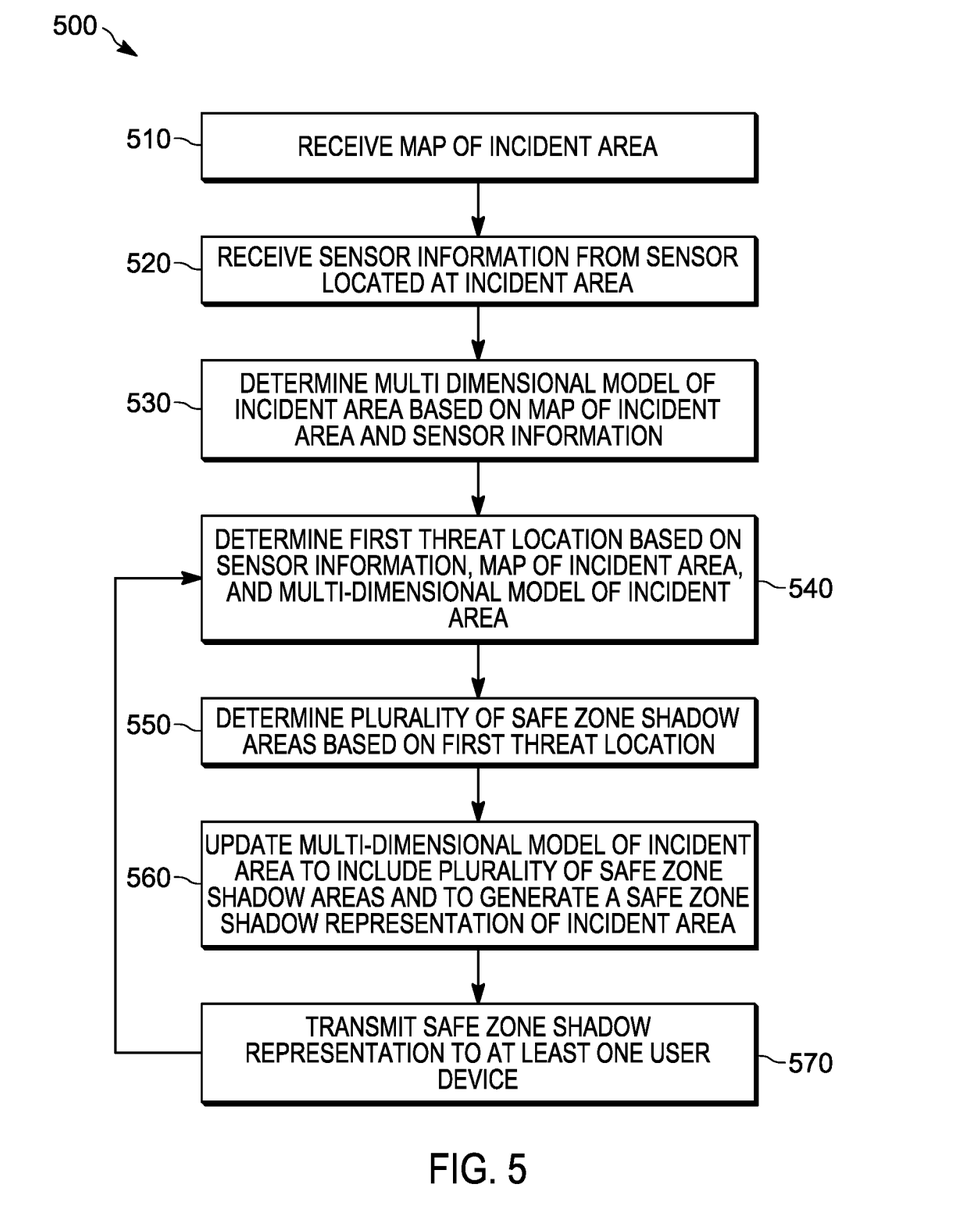
FIG. 5 is a flowchart of a method of providing safe zone information in accordance with some embodiments.

FIG. 5 is a flowchart illustrating one example method 500 of providing safe zone information. As illustrated in FIG. 5, the method 500 includes receiving, at the electronic processor 210, a map of the incident area 140 (at block 510). The electronic processor 210 may receive the map of the incident area 140 from a third-party map application server over the communication network 150. The third-party map application server may maintain maps of geographical areas covered by a public safety agency and provide the map of the incident area 140 within the geographical area upon receiving a request from the device 110. In some embodiments, maps of the geographical areas are pre-stored in the memory 220 and the electronic processor 210 accesses the map of the incident area 140 from the memory 220.

The method 500 also includes receiving, at the electronic processor 210, sensor information from at least one sensor 130 located at the incident area 140 (at block 520). The electronic processor 210 receives the sensor information over the communication network 150. The sensor information may include an image feed, a video feed, an audio feed, an ultrasonic feed, a sensor location data, a sensor orientation data, a sensor direction data, or the like. The sensor information includes information relating to the incident area 140. For example, the sensor information may include a video feed of a suspect at the incident area 140. In some embodiments, the sensors 130 may be controlled by the device 110, for example, to pan the sensors 130 to focus on the suspect.

The method 500 further includes determining, using the electronic processor 210, a multi-dimensional model of the incident area 140 based on the map of the incident area 140 and sensor information (at block 530). The multi-dimensional model may be a two-dimensional model or a three-dimensional model. In one example, the electronic processor 210 interpolates the map of the incident area 140 and the sensor information to determine the multi-dimensional model. Interpolation techniques currently known in the art may be used to determine the multi-dimensional model. In some embodiments, the map of the incident area 140 already includes a multi-dimensional model of the incident area 140. Thus, interpolation may not be required to determine a multi-dimensional model from the map of the incident area 140.

The example method 500 also includes determining, using the electronic processor 210, a first threat location based on sensor information, the map of the incident area 140, and the multi-dimensional model of the incident area 140 (at block 540). Upon receiving the sensor information, for example, an image feed or a video feed, a first threat is identified, for example, by using known image recognition techniques. Image recognition techniques may be used to identify a suspect, a weapon, explosive substances, or the like and determine these as the first threat. Once the first threat location is identified, a first threat location is determined on the multi-dimensional model of the incident area 140. In some embodiments, the multi-dimensional model including the first threat location is determined using the map of the incident area 140 and the sensor information. In some embodiments, the first threat is manually or automatically tagged and the first threat location is continually tracked, for example, using a drone camera following the first threat.

The method 500 further includes determining, using the electronic processor 210, a plurality of safe zone shadow areas based on the first threat location (at block 550). The first threat location is represented as a virtual source of light and the plurality of safe zone shadow areas are determined based on the virtual source of light acting on one or more objects in the multi-dimensional model of the incident area 140. Known shadow mapping techniques may be used to determine the plurality of safe zone shadow areas. These shadow mapping techniques are executed by the electronic processor 210 to determine the plurality of safe zone shadow areas.

The method 500 also includes updating, using the electronic processor 210, the multi-dimensional model of the incident area 140 to include the plurality of safe zone shadow areas and to generate a safe zone shadow representation of the incident area 140 (at block 560). Once the plurality of safe zone shadow areas are determined using shadow mapping techniques, the multi-dimensional model is updated to illustrate the plurality of safe zone shadow areas. Accordingly, the electronic processor 210 generates the safe zone shadow representation of the incident area 140 which includes the multi-dimensional model illustrating the plurality of safe zone shadow areas.

Figure 6:
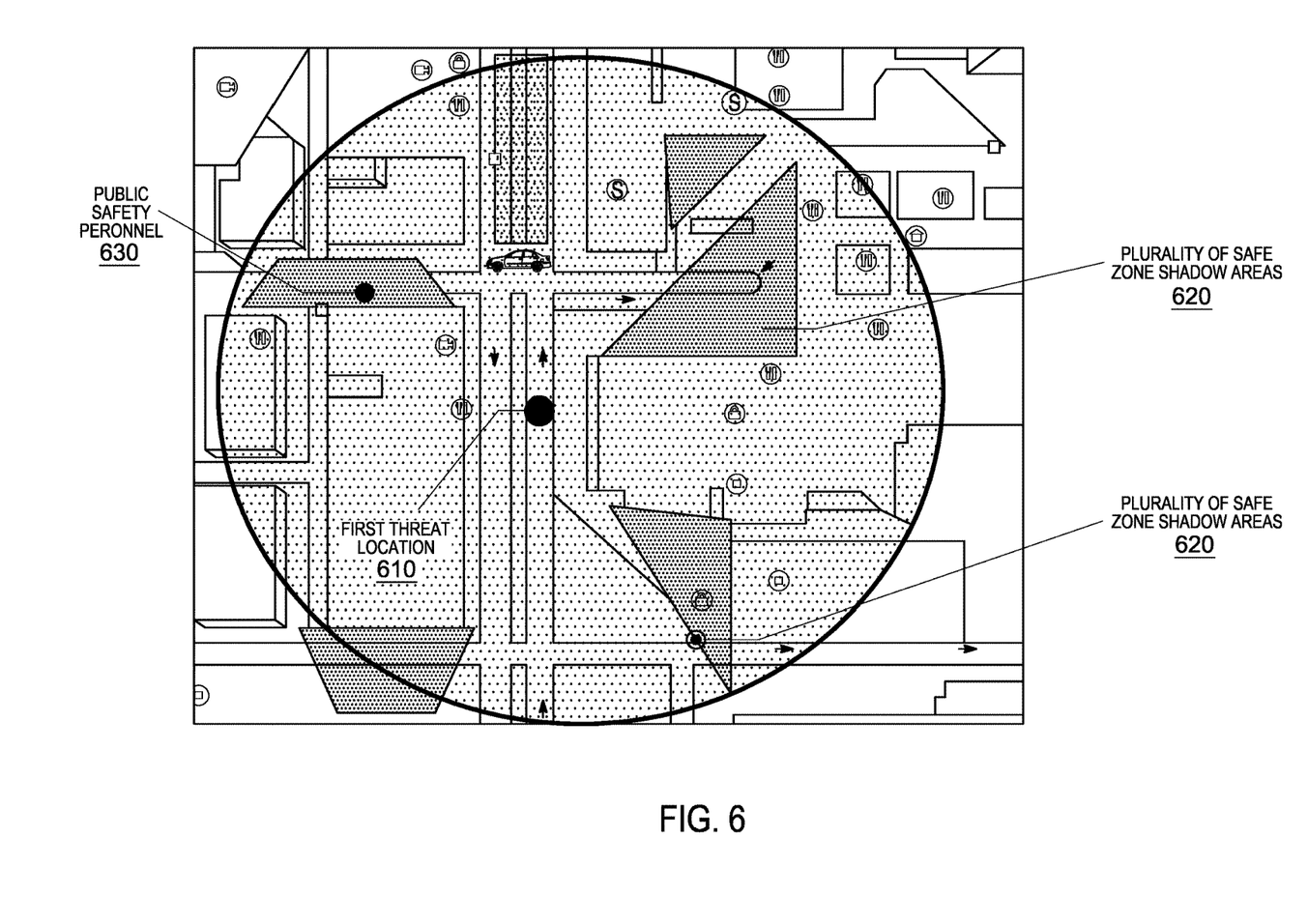
FIG. 6 is a diagram of an example of safe zone information provided in FIG. 5 in accordance with some embodiments.

FIG. 6 illustrates an example two-dimensional model safe zone shadow representation 600 of the incident area 140 that may be generated by the electronic processor 210. The two-dimensional model safe zone shadow representation 600 illustrates the first threat location 610, and a plurality of safe zone shadow areas 620. The two-dimensional model safe zone shadow representation 600 may also illustrate a location of the public safety personnel 630. In some embodiments, the representations in the two-dimensional model safe zone shadow representation 600 may be color coded to indicate whether the representation is the first threat location, is a public safety officer within a safe zone, is a public safety office not within a safe zone, and the like.

Figure 7:
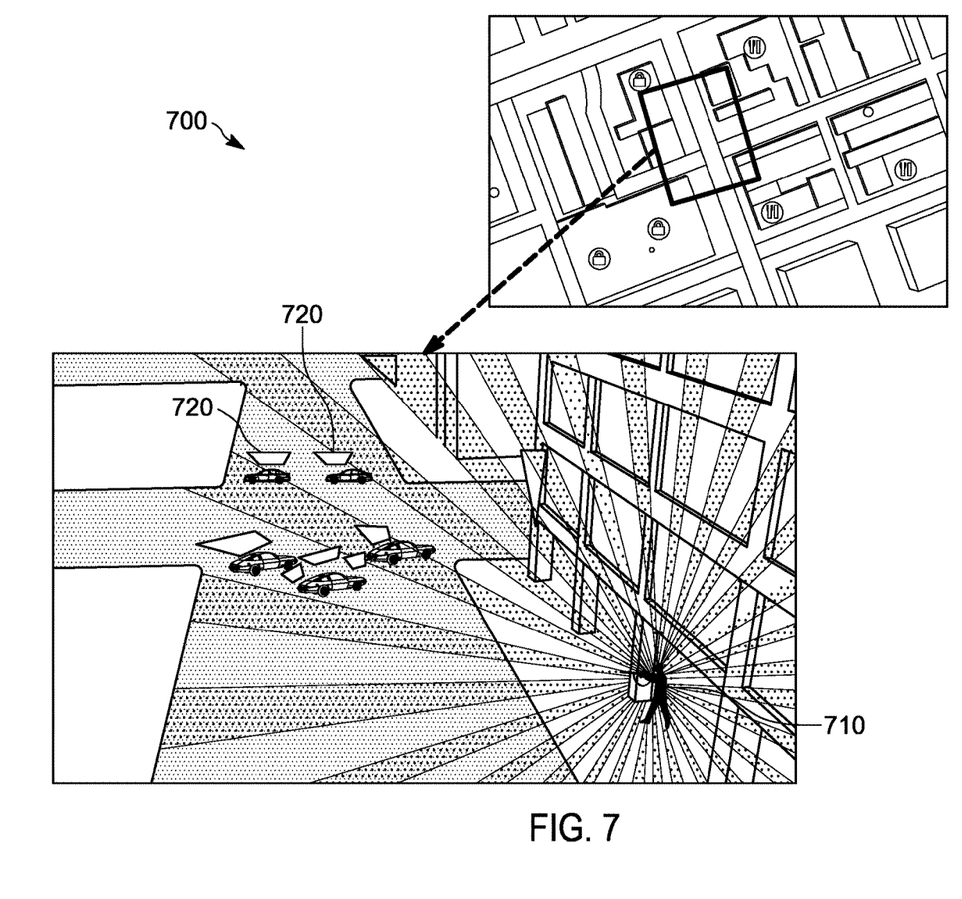
FIG. 7 is a diagram of an example of safe zone information provided in FIG. 5 in accordance with some embodiments.

FIG. 7 illustrates an example three-dimensional model safe zone shadow representation 700 of the incident area 140 that may be generated by the electronic processor 210. The three-dimensional model safe zone shadow representation 700 illustrates the first threat location 710, and a plurality of safe zone shadow areas 720. The three-dimensional model safe zone shadow representation 700 may also illustrate a location of the public safety personnel (not shown). In some embodiments, the representations in the three-dimensional model safe zone shadow representation 700 may be color coded to indicate whether the representation is the first threat location, is a public safety officer within a safe zone, is a public safety office not within a safe zone, and the like.

Figure 8:
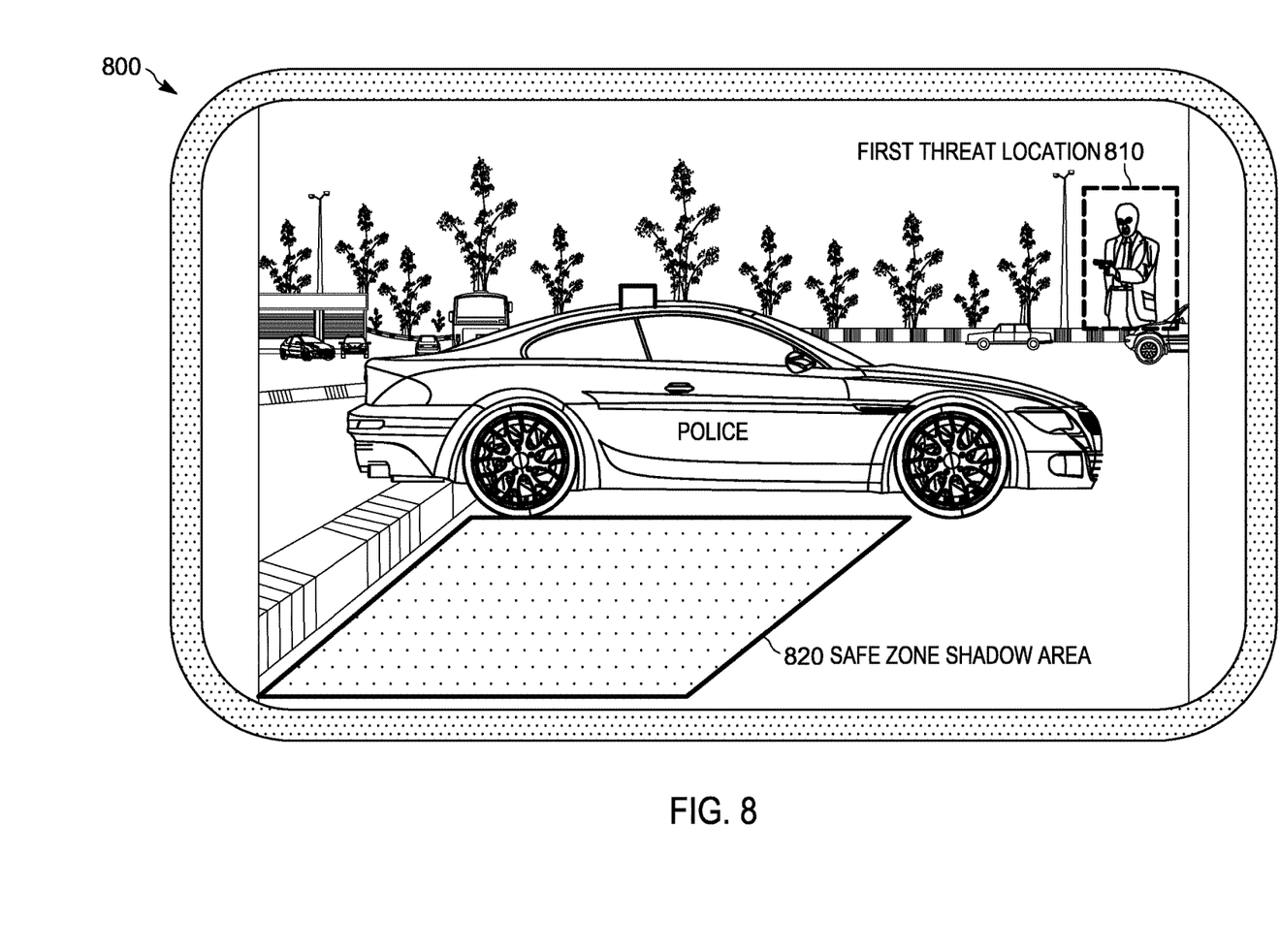
FIG. 8 is a diagram of an example of safe zone information provided in FIG. 5 in accordance with some embodiments.

FIG. 8 illustrates an example three-dimensional augmented reality model safe zone shadow representation 800 of the incident area 140 that may be generated by the electronic processor 210. The augmented reality model safe zone shadow representation 800 illustrates the first threat location 810, and a safe zone shadow area 820. The augmented reality model safe zone shadow representation 800 may also illustrate a location of the public safety personnel (not shown). In some embodiments, the representations in the augmented reality model safe zone shadow representation 800 is color-coded to indicate whether the representation is the first threat location, is a public safety officer within a safe zone, is a public safety officer outside a safe zone, and the like. The augmented reality model safe zone shadow representation 800 may be displayed in, for example, a head-mounted display.

Returning to FIG. 5, the method 500 further includes transmitting, using a transmitter coupled to the electronic processor 210, the safe zone shadow representation to at least one user device 120 (at block 570). When the safe zone shadow representation is generated (for example, any one of 600, 700, 800), the safe zone shadow representation is transmitted to the user devices 120 over the communication network 150.

The method 500 returns to block 540 to continuously monitor threat location and to continuously update the safe zone shadow representation. Updating the safe zone shadow representation may include receiving a second threat location. In incident area 140, the threat may not be stationary and may continuously be moving. When the threat moves to a different location than the first threat location, the electronic processor 210 receives the new location of the threat as the second threat location. Updating the safe zone shadow representation also includes determining a second plurality of safe zone shadow areas based on the second threat location. The second threat location is represented as the virtual source of light and the second plurality of safe zone shadow areas are determined based on the virtual source of light acting on the one or more objects in the multi-dimensional model of the incident area 140. The second plurality of safe zone shadow areas may be determined using the shadow mapping techniques as described above.

When the second plurality of safe zone shadow areas are determined, the electronic processor 210 updates the multi-dimensional model of the incident area 140 to replace the plurality of safe zone shadow areas with the second plurality of safe zone shadow areas to generate a second safe zone shadow representation. The electronic processor 210 then transmits the second safe zone shadow representation to the at least one user device 120.

In some embodiments, the device 110 notifies users of the user devices 120 that they are in an unsafe zone. The electronic processor 210 may continuously receive location of a first user device 120A. The location of the first user device 120A may be received over the communication network 150. The electronic processor 210 determines whether the first user device 120 is within one of the plurality of safe zone shadow areas based on the location of the first user device 120 and the safe zone shadow area information. When the electronic processor 210 determines that the first user device 120A is not within one of the plurality of safe zone shadow areas, the electronic processor 210 transmits an alert to the first user device 120A indicating that the first user device 120A is not within one of the plurality of safe zone shadow areas. The alert may be an audible alert, a text alert, or the like. In one example, the electronic processor 210 transmits the alert to the first user device 120A in response to which the first user device 120A produces an audible beep.

In some embodiments, the device 110 changes the parameters of the safe zone shadow representation. The electronic processor 210 receives attribute information associated with the first threat location. The attribute information may be, for example, a facing direction of a suspect, a facing direction of a weapon held by the suspect, an explosive range of an explosive substance, and the like. The electronic processor 210 may change a parameter associated with the virtual source of light based on the attribute information. The parameter may be at least one selected from a group consisting of an intensity of the virtual source of light, a color of the safe zone shadow area illustration, a shadow contrast level of the safe zone shadow area illustration, a projection of the virtual source of light, a direction of the virtual source of light (for example, converting the virtual source of light to an unidirectional or an omnidirectional source of light, a light reach distance, a gradient parameter of multiple-colored lights and a flashing pattern of the virtual light source).

Figure 9:
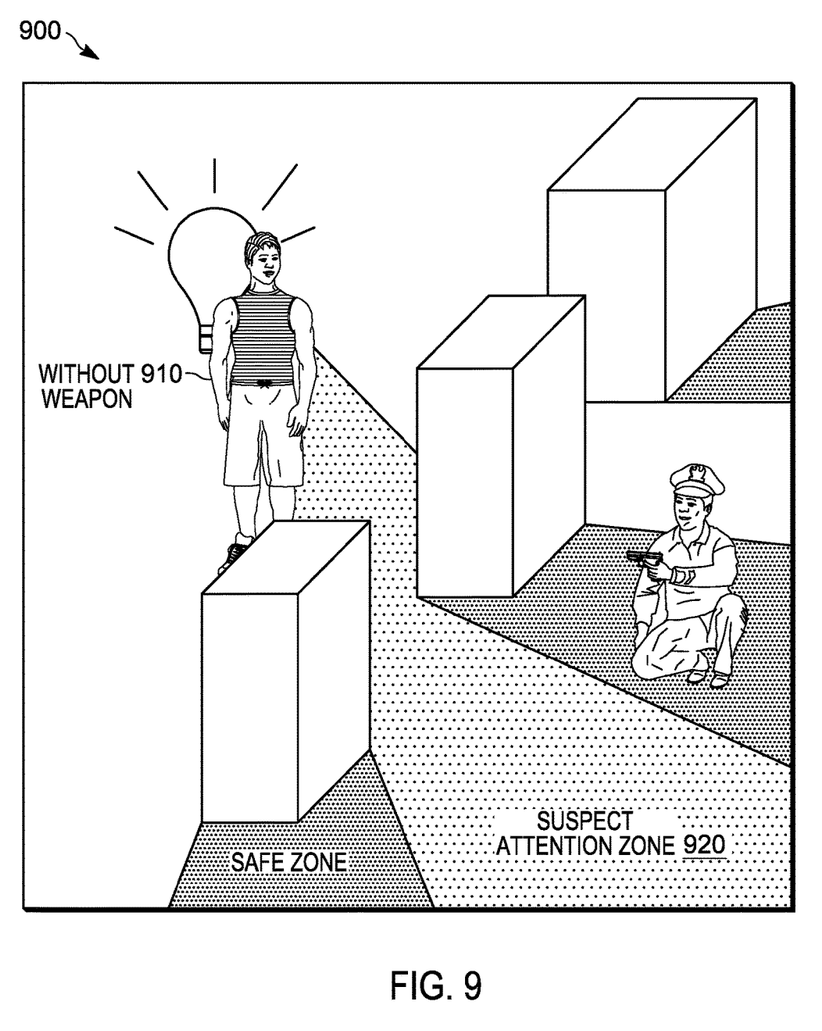
FIG. 9 is a diagram of an example of safe zone information provided in FIG. 5 in accordance with some embodiments.

In one example, the first threat location is a location of a person and the attribute information is a direction the person is facing. The direction the person is facing may be determined, for example, by running known video analytics techniques on sensor information such as a video feed. The electronic processor 210 may adjust a direction parameter of the virtual source of light. FIG. 9 shows a safe zone shadow representation 900 showing a facing direction of the first threat location 910 and updating the direction parameter of the virtual source of light such that a suspect attention zone 920 is now illustrated.

Figure 10:
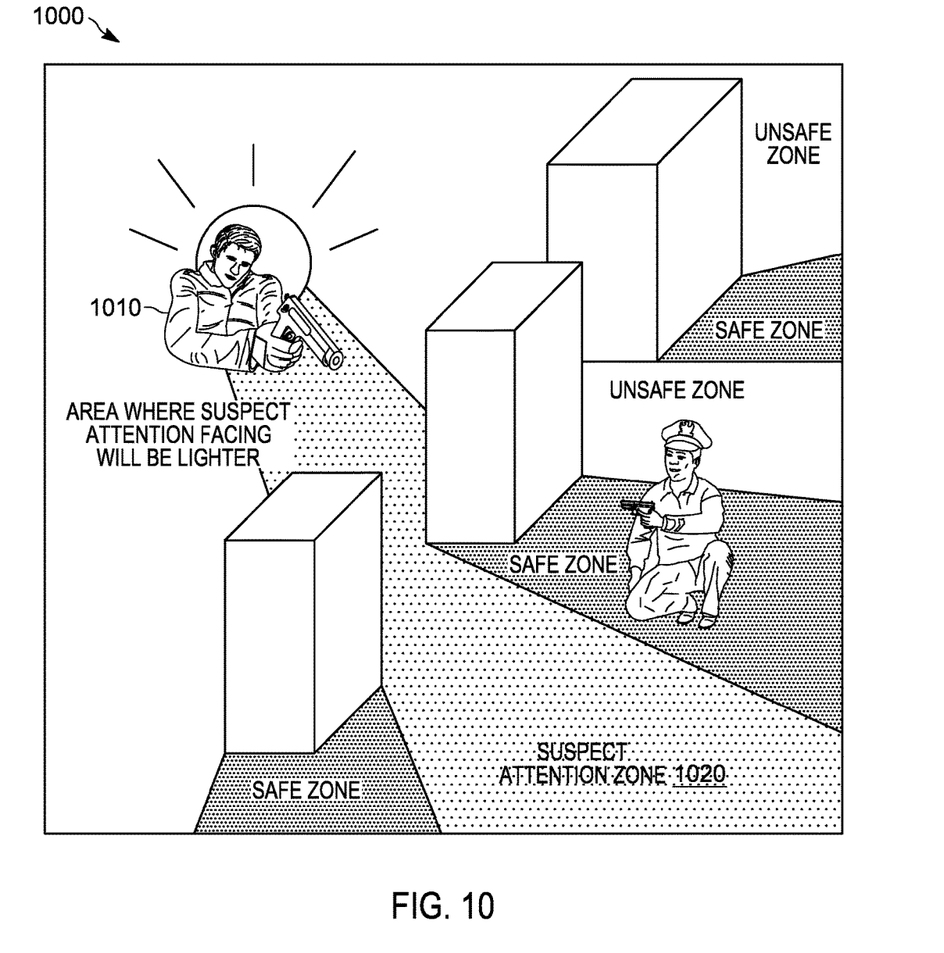
FIG. 10 is a diagram of an example of safe zone information provided in FIG. 5 in accordance with some embodiments.

In one example, the first threat location is a location of a person and the attribute information is a direction of a weapon possessed by the person. The direction of the weapon possessed by the person may be determined, for example, by running known video analytics techniques on sensor information such as a video feed. The electronic processor 210 adjusts a direction parameter of the virtual source of light. FIG. 10 shows a safe zone shadow representation 1000 illustrating a facing direction of a weapon of the first threat location 1010 and updating the direction parameter of the virtual source of light such that a suspect attention zone 1020 showing where the weapon is pointed is now illustrated.

In one example, the first threat location is a location of a person and the attribute information is a type of weapon possessed by the person. The electronic processor 210 may adjust a color parameter of the virtual source of light based on the type of weapon possessed by the person. For example, the color may be changed based on whether the person is armed or disarmed, the attacking range of the weapon possessed by the person when the person is armed. In another example, the color of the light source is a gradient of multiple colors. In one implementation, the color varies from a red color to an orange color and the distance of a first color of the multiple colors (that is, the distance of the red color extending from the threat location 1010) depends on the attacking range of the weapon. For example, when the weapon is a knife, the red color distance from the threat location will be relatively short to indicate a short attacking range of the weapon. The orange color may accordingly extend from where the red color ends. Similarly, when the weapon is a pistol, the red color distance from the threat location will be relatively longer than that of the knife to indicate the relatively longer attacking range of the pistol. The orange color similarly extends from where the red color ends.

In one example, the first threat location is a location of a person and the attribute information is a physical condition of the person. The physical condition may be, for example, whether the person is dead, whether the person is injured or disabled, or the like. The electronic processor 210 adjusts a color parameter of the virtual light source or a shadow area parameter based on the physical condition of the person. For example, when a suspect is injured after police gun fire, the light intensity of the suspect is dimmed to indicate that the suspect is injured. The intensity of the light may depend on the severity of the suspect's injury.

In some embodiments, in addition to determining a first threat location, the device 110 also detects objects of interest, for example, hostages, contraband, and the like. Detecting objects of interest may include determining that a first object from the one or more objects in the multi-dimensional model is an object of interest. The first object may be determined using image recognition techniques as described above. The electronic processor 210 may provide a representation of the first object on a first safe zone shadow area associated with the first object. That is, the electronic processor 210 may represent the first object as a shadow area using the first safe zone shadow area by for example, giving the first safe zone shadow area a different color than the plurality of safe zone shadow areas. In some embodiments, the electronic processor 210 also overlays an image of the object, for example, a face of a suspect or a hostage on the first safe zone shadow area.

Figure 11:
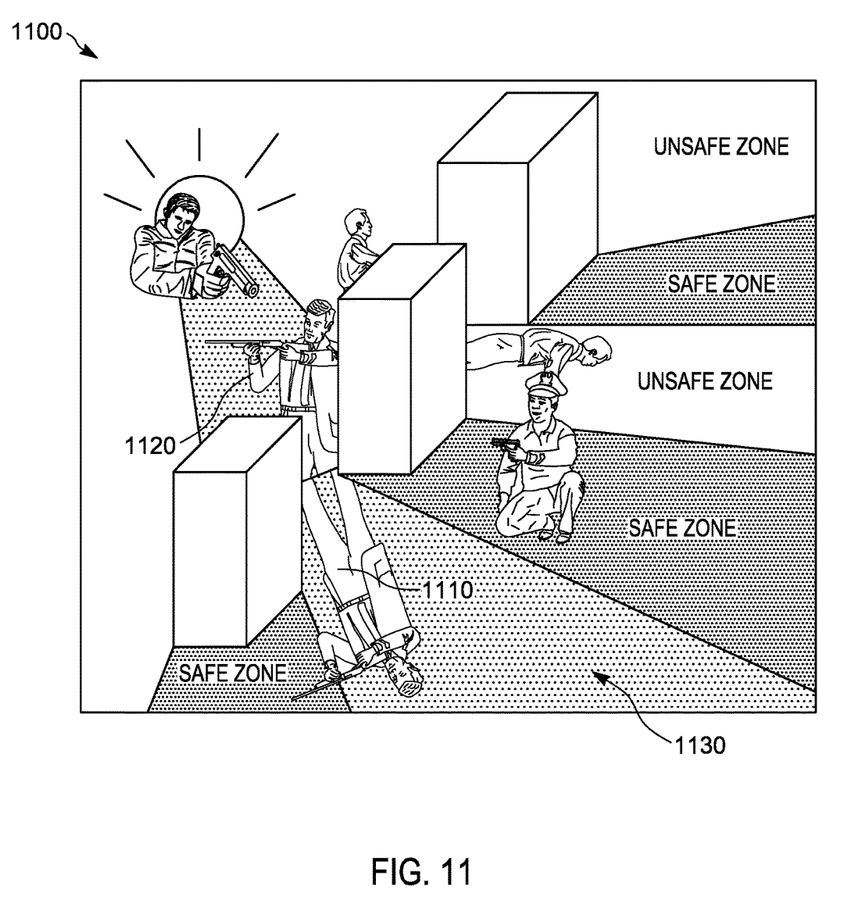
FIG. 11 is a diagram of an example of safe zone information provided in FIG. 5 in accordance with some embodiments.

FIG. 11 shows a safe zone shadow representation 1100 illustrating a first unsafe zone shadow area 1110 associated with a first object 1120. In the example illustrated, an image of the suspect (who is identified as the first object 1120) is overlaid on the first unsafe zone shadow area 1110 that is within a suspect attention zone 1130. In some embodiments, a parameter of the shadow (for example, a color or intensity of the shadow) may be varied based on an attribute of the first object 1120 (for example, whether the first object is armed or disarmed).

In some embodiments, the electronic processor 210 determines that the first object is a second threat, that is, a second suspect, an explosive chemical or the like. In these embodiments, the electronic processor 210 determines that the first object is at a second threat location. As described above, the electronic processor 210 determines a location of the first object based on the sensor information and the map of the incident area 140. The electronic processor 210 then determines a second plurality of safe zone shadow areas based on the first threat location and the second threat location. The first threat location and the second threat location are represented as a first virtual source of light and a second virtual source of light and the plurality of safe zone shadow areas are determined based on the first virtual source of light and the second virtual source of light acting on the one or more objects in the multi-dimensional model of the incident area 140. The second plurality of safe zone shadow areas are determined using shadow mapping techniques as described above. In one example, an overlapping area between the first virtual source of light and the second virtual source of light may be augmented with a higher intensity of color to illustrate the increased criticality of that zone.

In some embodiments, the light may be turned off and the shadow may be removed from a user device user interface when the threat location is determined to no longer be a threat (for example, when a suspect at the threat location is arrested).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of providing safe zone information, the method comprising:
   receiving, at an electronic processor, a map of an incident area;
   receiving, at the electronic processor, sensor information from at least one sensor located at the incident area;
   determining, using the electronic processor, a multi-dimensional model of the incident area based on the map of the incident area and the sensor information;
   determining, using the electronic processor, a first threat location based on the sensor information, the map of the incident area, and the multi-dimensional model of the incident area;
   determining, using the electronic processor, a plurality of safe zone shadow areas based on the first threat location, the first threat location being represented as a virtual source of light and the plurality of safe zone shadow areas are determined based on the virtual source of light acting on one or more objects in the multi-dimensional model of the incident area;
   updating, using the electronic processor, the multi-dimensional model of the incident area to include the plurality of safe zone shadow areas and to generate a safe zone shadow representation of the incident area; and
   transmitting, using a transmitter coupled to the electronic processor, the safe zone shadow representation to at least one user device in the incident area.

2. The method of claim 1, further comprising:
   receiving a second threat location;
   determining a second plurality of safe zone shadow areas based on the second threat location, the second threat location being represented as the virtual source of light and the second plurality of safe zone shadow areas are determined based on the virtual source of light acting on the one or more objects in the multi-dimensional model of the incident area;
   updating the multi-dimensional model of the incident area to replace the plurality of safe zone shadow areas with the second plurality of safe zone shadow areas and to generate a second safe zone shadow representation; and
   transmitting the second safe zone shadow representation to the at least one user device.

3. The method of claim 1, further comprising:
   receiving a location of a first user device;
   determining that the first user device is not within one of the plurality of safe zone shadow areas based on the location of the first user device; and
   transmitting an alert to the first user device indicating that the first user device is not within one of the plurality of safe zone shadow areas.

4. The method of claim 1, further comprising:
   receiving attribute information associated with the first threat location; and
   changing a parameter associated with the virtual source of light based on the attribute information, wherein the parameter is at least one selected from a group consisting of an intensity, a color, a shadow contrast level, a projection, a direction, a light reach distance, a gradient parameter of multiple-colored lights and a flashing pattern.

5. The method of claim 4, wherein the first threat location is a person, the attribute information is a direction the person is facing, and the parameter is a direction of the virtual source of light.

6. The method of claim 4, wherein the first threat location is a person, the attribute information is a direction of weapon possessed by the person, and the parameter is a direction of the virtual source of light.

7. The method of claim 1, further comprising:
   determining that a first object from the one or more objects is an object of interest; and
   providing a representation of the first object on a first safe zone shadow area associated with the first object.

8. The method of claim 7, further comprising:
   determining that the first object is at a second threat location; and
   determining a second plurality of safe zone shadow areas based on the first threat location and the second threat location, the first threat location and the second threat location being represented as a first virtual source of light and a second virtual source of light and the plurality of safe zone shadow areas are determined based on the first virtual source of light and the second virtual source of light acting on the one or more objects in the multi-dimensional model of the incident area.

9. A device for providing safe zone information, the device comprising:
   a transmitter;
   an electronic processor coupled to the transmitter, the electronic processor configured to:
      receive a map of an incident area;
      receive sensor information from a sensor located at the incident area;
      determine a multi-dimensional model of the incident area based on the map of the incident area and the sensor information;
      determine a threat location based on the sensor information, the map of the incident area and the multi-dimensional model of the incident area;
      determine a plurality of safe zone shadow areas based on the threat location, the threat location being represented as a virtual source of light and the plurality of safe zone shadow areas are determined based on the virtual source of light acting on one or more objects in the multi-dimensional model of the incident area;
      update the multi-dimensional model of the incident area to include the plurality of safe zone shadow areas and to generate a safe zone shadow representation of the incident area; and
      transmit, using the transmitter, the safe zone shadow representation to at least one user device in the incident area.

10. The device of claim 9, wherein the electronic processor is further configured to:
    receive a second threat location;
    determine a second plurality of safe zone shadow areas based on the second threat location, the second threat location being represented as the virtual source of light and the second plurality of safe zone shadow areas are determined based on the virtual source of light acting on the one or more objects in the multi-dimensional model of the incident area;
    update the multi-dimensional model of the incident area to replace the plurality of safe zone shadow areas with the second plurality of safe zone shadow areas and to generate a second safe zone shadow representation; and transmit the second safe zone shadow representation to the at least one user device in the incident area.

11. The device of claim 9, wherein the electronic processor is further configured to:
   receive a location of a first user device;
   determine that the first user device is not within one of the plurality of safe zone shadow areas based on the location of the first user device; and
   transmit an alert to the first user device indicating that the first user device is not within one of the plurality of safe zone shadow areas.

12. The device of claim 9, wherein the electronic processor is further configured to:
   receive attribute information associated with the threat location; and
   change a parameter associated with the virtual source of light based on the attribute information, wherein the parameter is at least one selected from a group consisting of an intensity, a color, a shadow contrast level, a projection, a direction, a light reach distance, a gradient parameter of multiple-colored lights and a flashing pattern.

13. The device of claim 12, wherein the threat location is a person, the attribute information is a direction the person is facing, and the parameter is a direction of the virtual source of light.

14. The device of claim 12, wherein the threat location is a person, the attribute information is a direction of weapon possessed by the person, and the parameter is a direction of the virtual source of light.

15. The device of claim 9, wherein the electronic processor is further configured to:
   determine that a first object from the one or more objects is an object of interest; and
   provide a representation of the first object on a first safe zone shadow area associated with the first object.

16. The device of claim 15, wherein the electronic processor is further configured to:
   determine that the first object is at a second threat location; and
   determine a second plurality of safe zone shadow areas based on the threat location and the second threat location, the threat location and the second threat location being represented as a first virtual source of light and a second virtual source of light and the plurality of safe zone shadow areas are determined based on the first virtual source of light and the second virtual source of light acting on the one or more objects in the multi-dimensional model of the incident area.

* * * * *